(No Model.) 3 Sheets—Sheet 1.
G. F. JOHNSON.
PRESS FOR BUTTER AND OTHER PLASTIC MATERIAL.
No. 376,097. Patented Jan. 10, 1888.
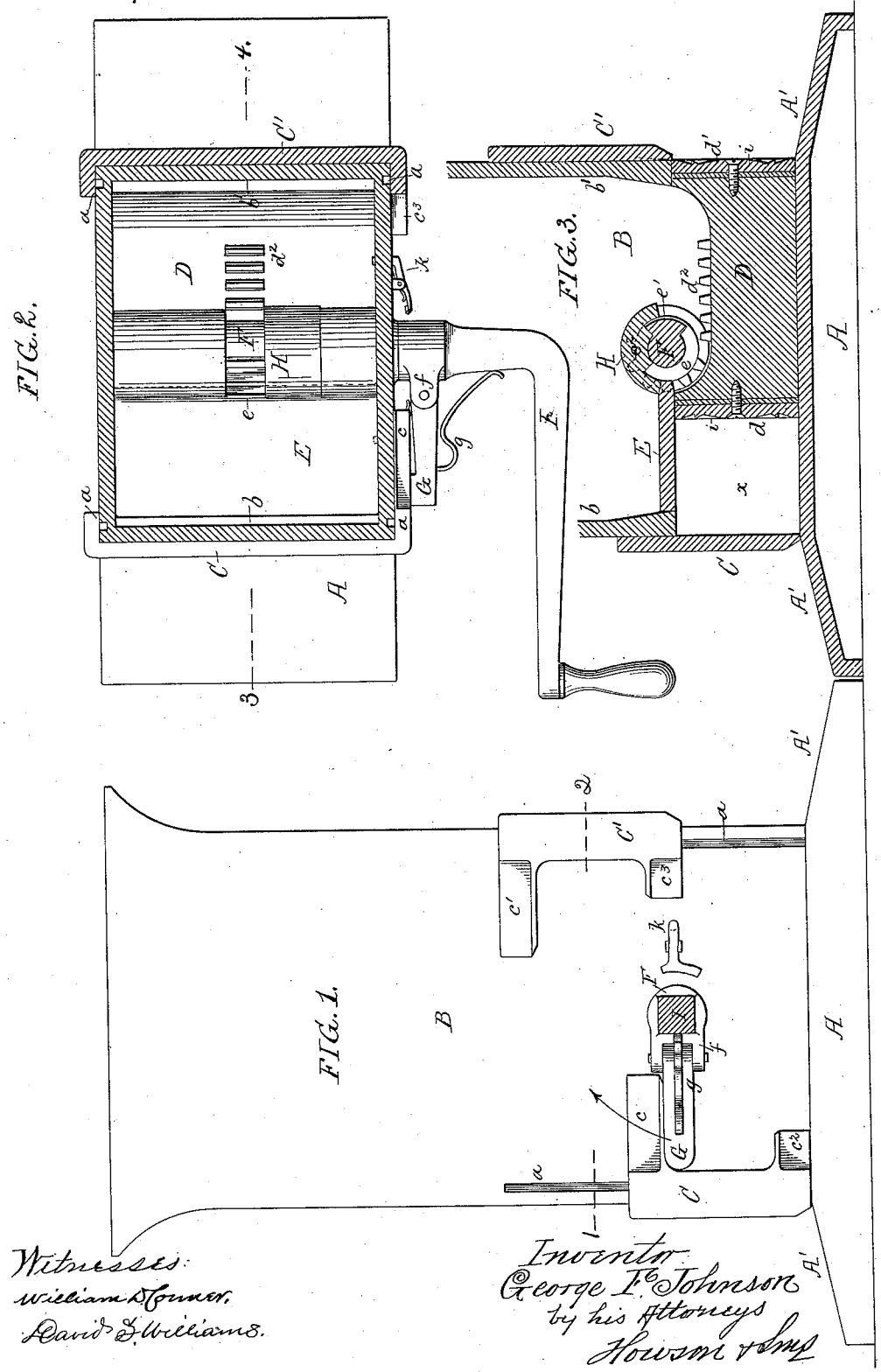
Witnesses:
William D. Turner
David F. Williams
Inventor
George F. Johnson
by his Attorneys
Howson & Sons (No Model.) 3 Sheets—Sheet 2.
G. F. JOHNSON.
PRESS FOR BUTTER AND OTHER PLASTIC MATERIAL.
No. 376,097. Patented Jan. 10, 1888.
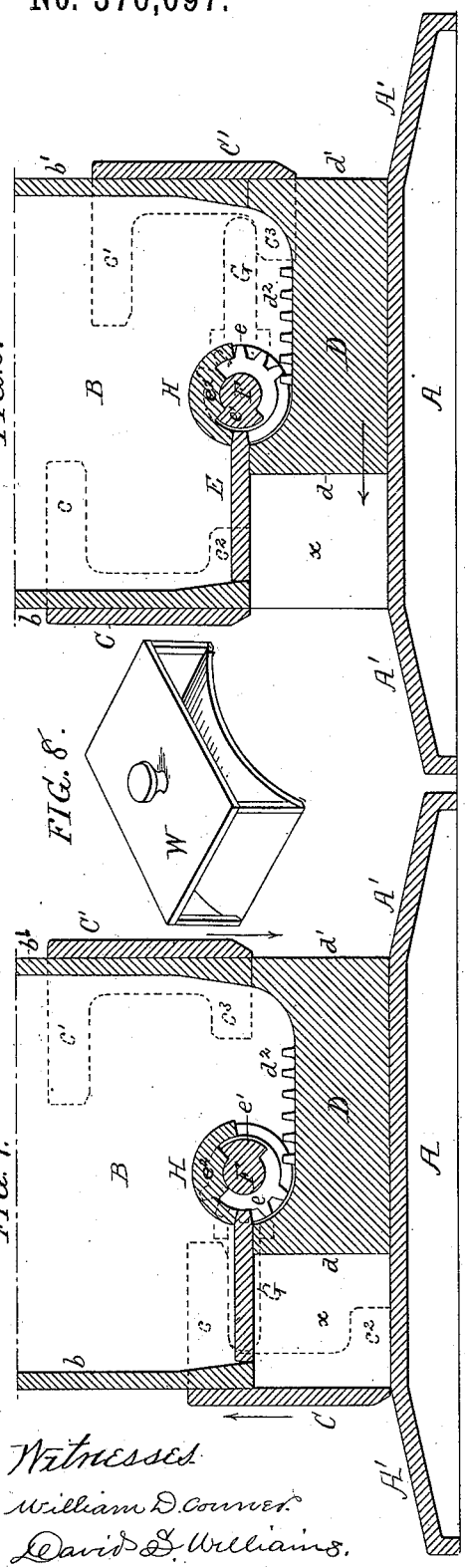
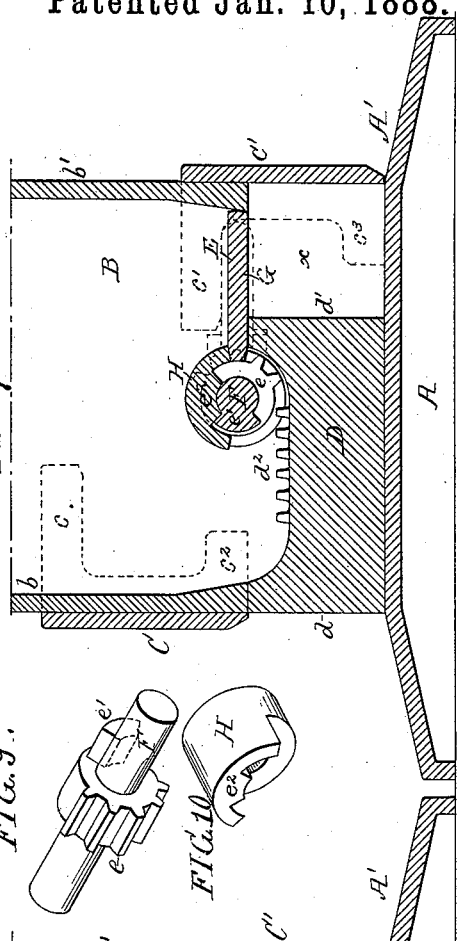
Witnesses
William D. Conner.
David D. Williams.
Inventor
George F. Johnson
by his Attorneys
Howson & Sons (No Model.) 3 Sheets—Sheet 3.

G. F. JOHNSON.
PRESS FOR BUTTER AND OTHER PLASTIC MATERIAL.

No. 376,097. Patented Jan. 10, 1888.

Witnesses:
David S. Williams,
Joseph H. Klein.

Inventor:
George F. Johnson
by his Attys.
Howson & Son

UNITED STATES PATENT OFFICE.

GEORGE F. JOHNSON, OF PHILADELPHIA, PENNSYLVANIA.

PRESS FOR BUTTER AND OTHER PLASTIC MATERIAL.

SPECIFICATION forming part of Letters Patent No. 376,097, dated January 10, 1888

Application filed July 15, 1886. Serial No. 208,071. (No model.)

*To all whom it may concern:*

Be it known that I, GEORGE F. JOHNSON, a citizen of the United States, residing in Philadelphia, Pennsylvania, have invented certain Improvements in Presses for Butter and other Plastic Material, of which the following is a specification.

The object of my invention is to construct a strong and simple hand butter-press, and a further object being to render the machine automatic, as fully described hereinafter.

Figure 11:
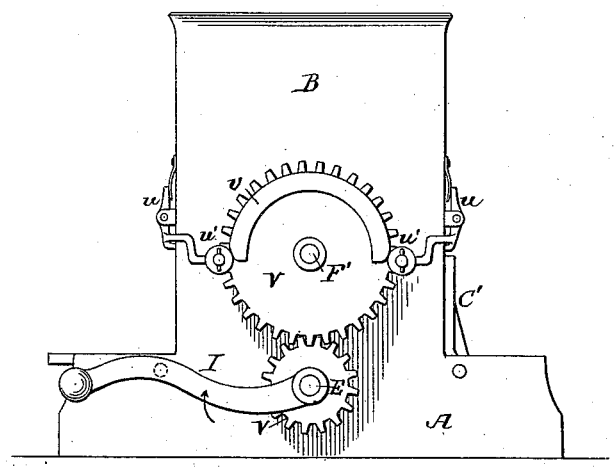
Figure 12:
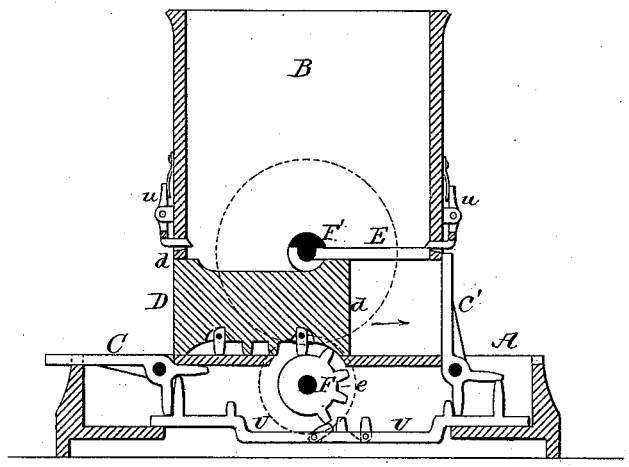

In the accompanying drawings, Figure 1 is a side elevation of my improved butter-press. Fig. 2 is a sectional plan on the line 1 2, Fig. 1. Fig. 3 is a longitudinal section on the line 3 4, Fig. 2. Figs. 4, 5, 6, and 7 are diagrams illustrating the movements of the different parts of the press. Fig. 8 is a perspective view drawn to a smaller scale of the press-block. Figs. 9 and 10 are detatched perspective views of part of the press. Fig. 11 is a side view of a modification, and Fig. 12 is a longitudinal section of the same.

Referring to Figs. 1, 2, and 3, A is the base of the press, and B the box or hopper. Openings are made in both ends, $b\ b'$, of the box, and sliding cover-plates C C' are so operated by devices described hereinafter that one of these openings is always closed. Sliding on the base inside the box B is a plunger, D, having opposite heads, $d\ d'$.

E is a presser-plate hung to a shaft, F, having its bearings in the sides of the box B. The chamber $x$ is formed by the box and the presser-plate E.

On the plate C are projections $c\ c^2$, and on the plate C' are like projections, $c'\ c^3$, the plates being guided in the present instance by pins adapted to grooves $a$ in the sides of the box B, and are held in their raised position by friction or by catches $n$, as shown in Fig. 2.

To a stud, $f$, secured to the shaft F, is pivoted an arm, G, a spring, $g$, tending to maintain the outer end of the arm in contact with the side of the box, but permitting it to yield when it passes over either of the projections $c$, $c'$, $c^2$, or $c^3$, these projections being beveled on one face, but abrupt on the other.

On the upper portion of the plunger D is a rack, $d^2$, with which engages a segmental pinion, $e$, on the shaft F. On the shaft F is a projection, $e'$, which engages with a projection, $e^2$, on a loose sleeve, H, on the shaft, said sleeve engaging with the plate E, the sleeve being recessed, and the projections $e'\ e^2$ being such that considerable lost motion of the shaft J is permitted, as described hereinafter. Print-blocks $i$ are secured to the ends $d\ d'$ of the plunger D, these print-blocks being detachable, so that the operator can use any print desired.

The operation of this automatic press is as follows, referring to the diagrams, Figs. 4, 5, 6, and 7: The butter is placed in the box or hopper B, and a weighted press-block, W, is placed on the top of the butter to force the same downward, or a hand-presser, W, Fig. 8, may be used for the same purpose. The handle I is turned forward to the extent of one revolution and a half and then reversed. Supposing the parts to be in the position shown in Figs. 1 and 4, the handle is moved in the direction of the arrow, Fig. 1. The arm G, by contact with the projection $c$ of the cover-plate C, will raise the said plate to the position shown in Fig. 5, the arm then clearing the projection. The arm next comes into contact with the projection $c^3$ on the plate C' and depresses said plate, as shown in Fig. 5, this movement also bringing the pinion $e$ into gear with the rack $d^2$ of the plunger D, and bringing the projection $e'$ against the shoulder $e^2$ on the sleeve H. When the plate C' is fully depressed, the pinion $e$ has forced the plunger D in the direction of its arrow to the position shown in Fig. 6, thus delivering the pressed butter onto the table A'. The sleeve H is now in position to engage with the presser-plate E, which, by the next half-revolution of the shaft, is turned over to the position shown in Fig. 7, thus pressing the butter into the molding-chamber $x$ prior to the retraction of the plunger on the reversal of the movement of the shaft. The plate E is retained in its extreme positions by spring-pins $k$, Figs. 1 and 2, which are acted upon by the arm G, so as to release the plate before each of its movements.

The modification shown in Figs. 11 and 12 shows a shaft, F, adapted to bearings in the base A, the pinion $e$ on the shaft acting on a rack on the under side of the plunger D and on a rack-bar, U, which is geared to the cover-plates C C', the latter being pivoted to the base.

The shaft F is geared to a shaft, F', by spur-wheels V V', and said shaft F' carries the sleeve H, for operating the presser-plate E. Pivoted spring-catches $u$, having arms carrying friction-rollers $u'$, are acted upon by a cam, $v$, on the spur-wheel V, so that before each movement of the plate E the catch will be withdrawn, releasing the plate.

The operation of this modification is as follows: The handle I is turned one-half of a revolution in the direction of its arrow, Fig. 11, the pinion $e$ operating on the rack U, which depresses the plate C' and elevates the plate C. During the next half-revolution of the handle the teeth of the pinion $e$ slip on the rack U, which has pivoted end teeth and engage with the teeth on the plunger D, thereby forcing the plunger in the direction of its arrow, Fig. 12, and delivering the molded butter onto the table formed by the turned-down plate C'. The shaft F' has now turned to the extent of one-half a revolution, and the cam $v$ releases the plate E from the control of the catch $u$ just before the sleeve H acts upon the plate to reverse it, the teeth of the pinion $e$ slipping on the spring-teeth at the end of the racks U and $d^2$. The movement of the handle is then reversed and the above operations are repeated in connection with the opposite side of the press. Two revolutions of the shaft F are necessary in this press to complete one full pressing and ejection operation.

It will be understood that my machine may be used for pressing other plastic materials than the one mentioned.

I claim as my invention—

1. The combination of the receptacle, a sliding cover-plate, a plunger, a presser-plate forming one side of the molding-chamber during the molding of the block, and means for reciprocating the plunger and vibrating the presser-plate, all substantially as specified.

2. The combination of the receptacle, opposite molding-chambers therein, sliding plates for closing the outer ends of said chambers, a plunger moving across the receptacle, one end of said plunger acting in connection with one molding-chamber and the other end in connection with the opposite molding-chamber, a presser-plate having two faces, one forming a side of one molding-chamber and the other forming a side of the opposite molding-chamber, and means for reciprocating the plunger and vibrating the presser-plate, all substantially as specified.

3. The combination of the receptacle, a reciprocating plunger, a vibrating presser-plate forming one side of the molding-chamber during the pressing operation, an operating-shaft, and mechanism whereby the within-described movements are imparted to said plunger and presser-plate, all substantially as specified.

4. The combination of the receptacle, a sliding cover-plate, a reciprocating plunger, a vibrating presser-plate forming one side of the molding-chamber during the pressing operation, an operating-shaft, and mechanism whereby the said shaft is caused to impart the within-described movement to the cover-plate, plunger, and presser-plate, all substantially as specified.

5. The combination of the receptacle, the plunger, the presser-plate, an operating-shaft, a segment pinion and rack whereby the movement of the shaft is imparted to the plunger, and a recessed driver for operating the presser-plate, whereby the alternate and intermittent operation of said plunger and presser-plate is effected, all substantially as specified.

6. The combination of the receptacle, opposite sliding cover-plates having projecting arms, an operating-shaft, a plunger, a rack and pinion for reciprocating the latter, and an arm carried by said shaft and acting upon the arms of the cover-plate to raise and lower the same, all substantially as specified.

In testimony whereof I have signed my name to this specification in the presence of two subscribing witnesses.

GEORGE F. JOHNSON.

Witnesses:
WILLIAM D. CONNER,
HARRY SMITH.